United States Patent
Blocksome

(10) Patent No.: US 8,018,951 B2
(45) Date of Patent: Sep. 13, 2011

(54) PACING A DATA TRANSFER OPERATION BETWEEN COMPUTE NODES ON A PARALLEL COMPUTER

(75) Inventor: Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 11/776,707

(22) Filed: Jul. 12, 2007

(65) Prior Publication Data

US 2009/0022156 A1    Jan. 22, 2009

(51) Int. Cl.
*H04L 12/28* (2006.01)

(52) U.S. Cl. .................. 370/395.7; 709/212; 710/22

(58) Field of Classification Search ............... 370/395.7, 370/235, 389, 394; 709/212, 217, 248; 710/308, 710/22–28, 212, 217; 719/313
See application file for complete search history.

(56) References Cited

U.S. PATENT DOCUMENTS

| | | |
|---|---|---|
| 4,933,846 A | 6/1990 | Humphrey et al. |
| 5,050,162 A | 9/1991 | Golestani |
| 5,136,582 A | 8/1992 | Firoozmand |
| 5,437,042 A | 7/1995 | Culley et al. |
| 5,448,698 A | 9/1995 | Wilkes |
| 5,617,537 A | 4/1997 | Yamada et al. |
| 5,680,116 A | 10/1997 | Hashimoto et al. |
| 5,689,509 A | 11/1997 | Gaytan et al. |
| 5,758,075 A | 5/1998 | Graziano et al. |
| 5,790,530 A | 8/1998 | Moh et al. |
| 5,796,735 A | 8/1998 | Miller et al. |
| 5,802,366 A | 9/1998 | Row et al. |
| 5,954,794 A | 9/1999 | Fishler et al. |
| 5,961,659 A | 10/1999 | Benner |
| 6,070,189 A | 5/2000 | Bender et al. |
| 6,072,781 A | 6/2000 | Feeney et al. |
| 6,105,122 A | 8/2000 | Muller et al. |
| 6,161,198 A | 12/2000 | Hill et al. |
| 6,356,951 B1 | 3/2002 | Gentry, Jr. |
| 6,711,632 B1 | 3/2004 | Chow et al. |
| 6,735,662 B1 | 5/2004 | Connor |
| 6,744,765 B1 | 6/2004 | Dearth et al. |
| 6,754,732 B1 | 6/2004 | Dixon et al. |
| 6,857,030 B2 | 2/2005 | Webber |
| 6,977,894 B1 | 12/2005 | Achilles et al. |
| 6,981,074 B2 | 12/2005 | Oner et al. |
| 7,031,305 B1 | 4/2006 | Yu et al. |
| 7,089,289 B1 * | 8/2006 | Blackmore et al. ........... 709/212 |
| 7,111,092 B1 | 9/2006 | Mitten et al. |
| 7,120,916 B1 | 10/2006 | Firth et al. |

(Continued)

OTHER PUBLICATIONS

Office Action Dated Apr. 1, 2010 in U.S. Appl. No. 11/739,948.

(Continued)

*Primary Examiner* — Jung Park
(74) *Attorney, Agent, or Firm* — Biggers & Ohanian, LLP

(57) ABSTRACT

Methods, systems, and products are disclosed for pacing a data transfer between compute nodes on a parallel computer that include: transferring, by an origin compute node, a chunk of an application message to a target compute node; sending, by the origin compute node, a pacing request to a target direct memory access ('DMA') engine on the target compute node using a remote get DMA operation; determining, by the origin compute node, whether a pacing response to the pacing request has been received from the target DMA engine; and transferring, by the origin compute node, a next chunk of the application message if the pacing response to the pacing request has been received from the target DMA engine.

15 Claims, 8 Drawing Sheets

U.S. PATENT DOCUMENTS

| | | | |
|---|---|---|---|
| 7,155,541 | B2 | 12/2006 | Ganapathy et al. |
| 7,890,670 | B2 | 2/2011 | Archer et al. |
| 2003/0233497 | A1 | 12/2003 | Shih |
| 2004/0057380 | A1 | 3/2004 | Biran et al. |
| 2004/0078405 | A1 | 4/2004 | Bhanot et al. |
| 2004/0218631 | A1 | 11/2004 | Ganfield |
| 2005/0033874 | A1* | 2/2005 | Futral et al. ............ 710/22 |
| 2005/0078669 | A1 | 4/2005 | Oner |
| 2005/0091334 | A1* | 4/2005 | Chen et al. ............ 709/216 |
| 2005/0114561 | A1 | 5/2005 | Lu et al. |
| 2005/0198113 | A1 | 9/2005 | Mohamed et al. |
| 2005/0213570 | A1 | 9/2005 | Stacy et al. |
| 2006/0045005 | A1 | 3/2006 | Blackmore et al. |
| 2006/0045109 | A1 | 3/2006 | Blackmore et al. |
| 2006/0047771 | A1 | 3/2006 | Blackmore et al. |
| 2006/0056405 | A1 | 3/2006 | Chang et al. |
| 2006/0075057 | A1 | 4/2006 | Gildea et al. |
| 2006/0190640 | A1 | 8/2006 | Yoda et al. |
| 2006/0206635 | A1 | 9/2006 | Alexander et al. |
| 2006/0218429 | A1 | 9/2006 | Sherwin et al. |
| 2006/0230119 | A1 | 10/2006 | Hausauer et al. |
| 2006/0253619 | A1 | 11/2006 | Torudbakken et al. |
| 2007/0041383 | A1* | 2/2007 | Banikazemi et al. ...... 370/395.3 |
| 2007/0165672 | A1 | 7/2007 | Keels et al. |
| 2008/0109573 | A1 | 5/2008 | Leonard et al. |
| 2008/0222317 | A1 | 9/2008 | Go et al. |
| 2008/0273543 | A1 | 11/2008 | Blocksome et al. |
| 2009/0125604 | A1 | 5/2009 | Chang et al. |
| 2009/0276582 | A1 | 11/2009 | Furtek et al. |
| 2010/0082848 | A1 | 4/2010 | Blocksome et al. |

OTHER PUBLICATIONS

Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.
U.S. Appl. No. 11/776,707, filed Jul. 12, 2007, Blocksome.
U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.
Moreira, et al.; The Blue Gene/L Supercomputer: A Hardware and Software Story; International Journal of Parallel Programming; Jun. 2007; pp. 181-206; vol. 35, No. 3; Springer Science+Business Media, LLC; USA.
Office Action, U.S. Appl. No. 11/764,302, mail date Jul. 28, 2010.
Office Action, U.S. Appl. No. 11/776,707, mail date Jul. 14, 2010.
Notice of Allowance, U.S. Appl. No. 11/746,333, mail date Jun. 23, 2010.
Notice of Allowance, U.S. Appl. No. 11/829,325, mail date May 21, 2010.
Notice of Allowance, U.S. Appl. No. 11/739,948, mail date Jul. 7, 2010.
Office Action, U.S. Appl. No. 11/740,361, mail date Apr. 30, 2010.
Kumar et al., A Network on Chip Architecture and Design Methodology, IEEE Computer Society Annual Symposium on VLSI, 2002.
Final Office Action, U.S. Appl. No. 11/776,707, mail date Jan. 6, 2011.
Final Office Action, U.S. Appl. No. 11/740,361, mail date Oct. 4, 2010.
Office Action, U.S. Appl. No. 11/755,501, mail date Nov. 26, 2010.
Moreira, et al.; The Blue Gene/L Supercomputer: A Hardware and Software Story; International Journal Of Parallel Programming; Jun. 2007; pp. 181-206; vol. 35, No. 3, Springer Science+Business Media LLC.; USA.
Notice of Allowance U.S. Appl. No. 11/754,719 Mail Date Apr. 6, 2010.
Office Action U.S. Appl. No. 11/744,319, Mail Date May 12, 2010.
Office Action U.S. Appl. No. 11/829,317 Mail Date May 26, 2010.
Final Office Action U.S. Appl. No. 11/746,348 Mail Date Feb. 23, 2010.
Notice of Allowance U.S. Appl. No. 11/758,167 Mail Date Mar. 12, 2010.
Office Action U.S. Appl. No. 11/754,719 Mail Date Oct. 14, 2008.
Office Action U.S. Appl. No. 11/754,719 Mail Date Mar. 4, 2009.
Office Action U.S. Appl. No. 11/758,167 Mail Date Nov. 21, 2008.
Office Action U.S. Appl. No. 11/744,296 Mail Date Aug. 20, 2009.
Office Action U.S. Appl. No. 11/746,348 Mail Date Sep. 2, 2009.
Final Office Action U.S. Appl. No. 11/758,167 Mail Date Apr. 24, 2009.
Final Office Action U.S. Appl. No. 11/754,719 Mail Date Aug. 5, 2009.
Final Office Action U.S. Appl. No. 11/744,296 Mail Date Feb. 24, 2010.
Notice of Allowance U.S. Appl. No. 11/746,348 Mail Date Oct. 5, 2010.

* cited by examiner

PACING A DATA TRANSFER OPERATION BETWEEN COMPUTE NODES ON A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for pacing a data transfer between compute nodes on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

When performing point to point message passing operations, a parallel application running on a compute node typically transmits a message to another compute node using messaging software installed on each compute node. Messaging software may partition the application message into multiple chunks that the messaging software transfers one at a time from an origin compute node to a target compute node. In transferring the message chunks, the messaging software may pace how often the messaging software transfers one of the chunks based on network congestion. In the current art, the messaging software on the origin node paces the data transfer operation by transferring a message chunk to the target node, pinging the target node for a ping response, and waiting to transfer the next message chunk until the origin compute node receives the ping response. Waiting to transfer the next message chunk until the ping response is received paces the data transfer of each chunk based on network congestion. Increased network congestion results in longer delays between the transfer of each message chunk, while decreased network congestion results in shorter delays between the transfer of each message chunk. The drawback to the current art, however, is that each time the origin node pings the target node, a processing core on the target node is interrupted from other processing tasks to process the ping request from the origin compute node. Interrupting the processing core on the target node to process the ping request is often a computationally expensive operation and typically decreases target node performance. As such, readers will appreciate that room for improvement exists in pacing a data transfer between compute nodes on a parallel computer.

SUMMARY OF THE INVENTION

Methods, systems, and products are disclosed for pacing a data transfer between compute nodes on a parallel computer that include: transferring, by an origin compute node, a chunk of an application message to a target compute node; sending, by the origin compute node, a pacing request to a target direct memory access ('DMA') engine on the target compute node using a remote get DMA operation; determining, by the origin compute node, whether a pacing response to the pacing request has been received from the target DMA engine; and transferring, by the origin compute node, a next chunk of the application message if the pacing response to the pacing request has been received from the target DMA engine.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
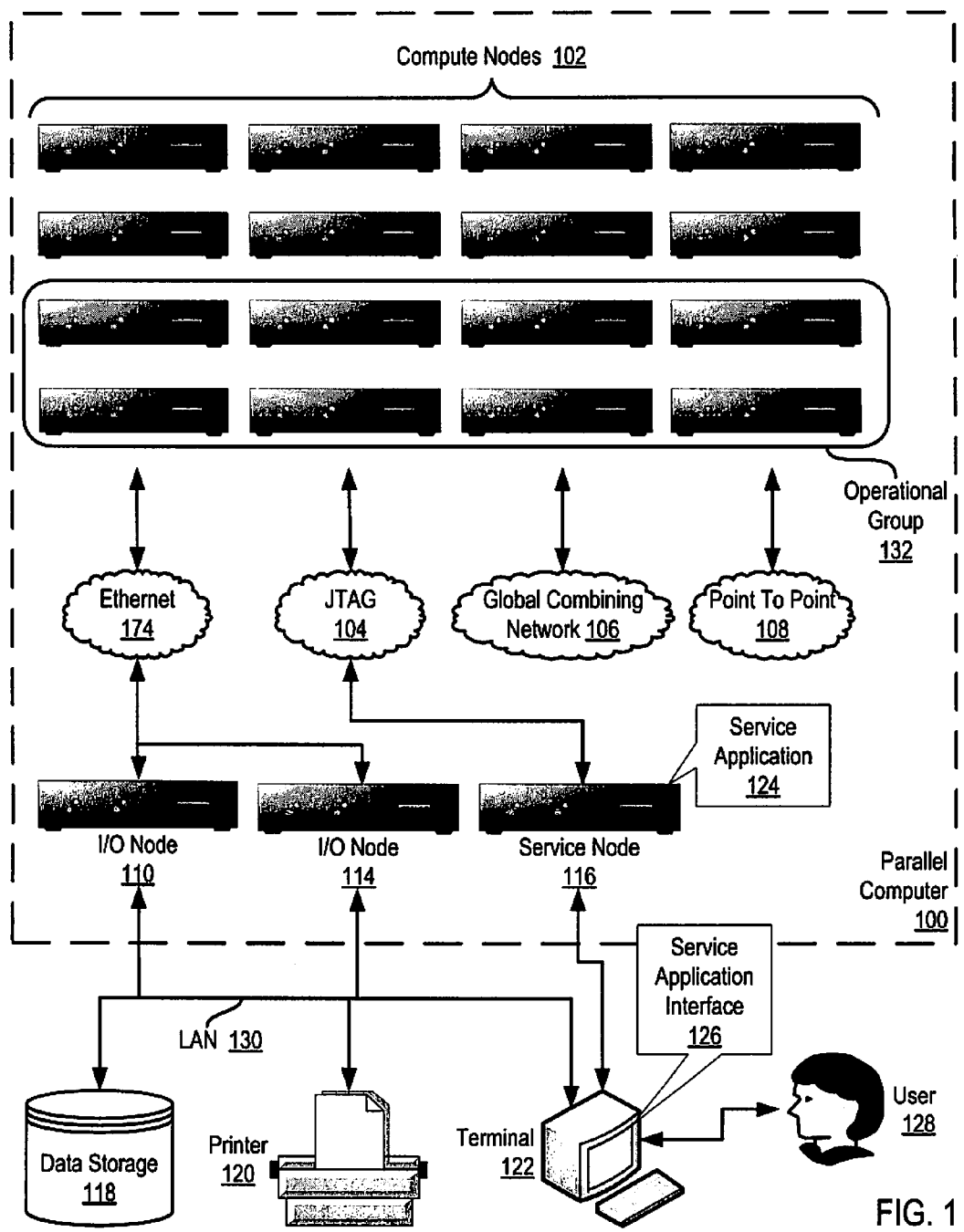
FIG. 1 illustrates an exemplary system for pacing a data transfer between compute nodes on a parallel computer according to embodiments of the present invention.

Exemplary methods, systems, and computer program products for pacing a data transfer between compute nodes on a parallel computer according to embodiments of the present invention are described with reference to the accompanying drawings, beginning with FIG. 1. FIG. 1 illustrates an exemplary system for pacing a data transfer between compute nodes on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |

-continued

| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for pacing a data transfer between compute nodes on a parallel computer according to embodiments of the present invention. Readers will note that the origin compute node is a compute node attempting to transmit an application message, while the target compute node is a compute node intended as the recipient of the application message. The system of FIG. 1 operates generally for pacing a data transfer between compute nodes on a parallel computer according to embodiments of the present invention as follows: An origin compute node transfers a chunk of an application message to a target compute node. The origin compute node sends a pacing request to a target direct memory access ('DMA') engine on the target compute node using a remote get DMA operation. A remote get DMA operation is an operation that allows a compute node to retrieve data from another compute node without involving the processor on the compute node providing the data. The origin compute node then determines whether a pacing response to the pacing request has been received from the target DMA engine. If the pacing response to the pacing request has been received from the target DMA engine, the origin compute node transfers the next chunk of the application message. The system of FIG. 1 may also operate generally for pacing a data transfer between compute nodes on a parallel computer according to embodiments of the present invention as follows: if the pacing response to the pacing request has not been received from the target DMA engine, the origin compute node waits to transfer the next chunk of the application message.

The arrangement of nodes, networks, and I/O devices making up the exemplary system illustrated in FIG. 1 are for explanation only, not for limitation of the present invention. Data processing systems capable of pacing a data transfer between compute nodes on a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of pacing a data transfer between compute nodes on a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Pacing a data transfer between compute nodes on a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of pacing a data transfer between compute nodes on a parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
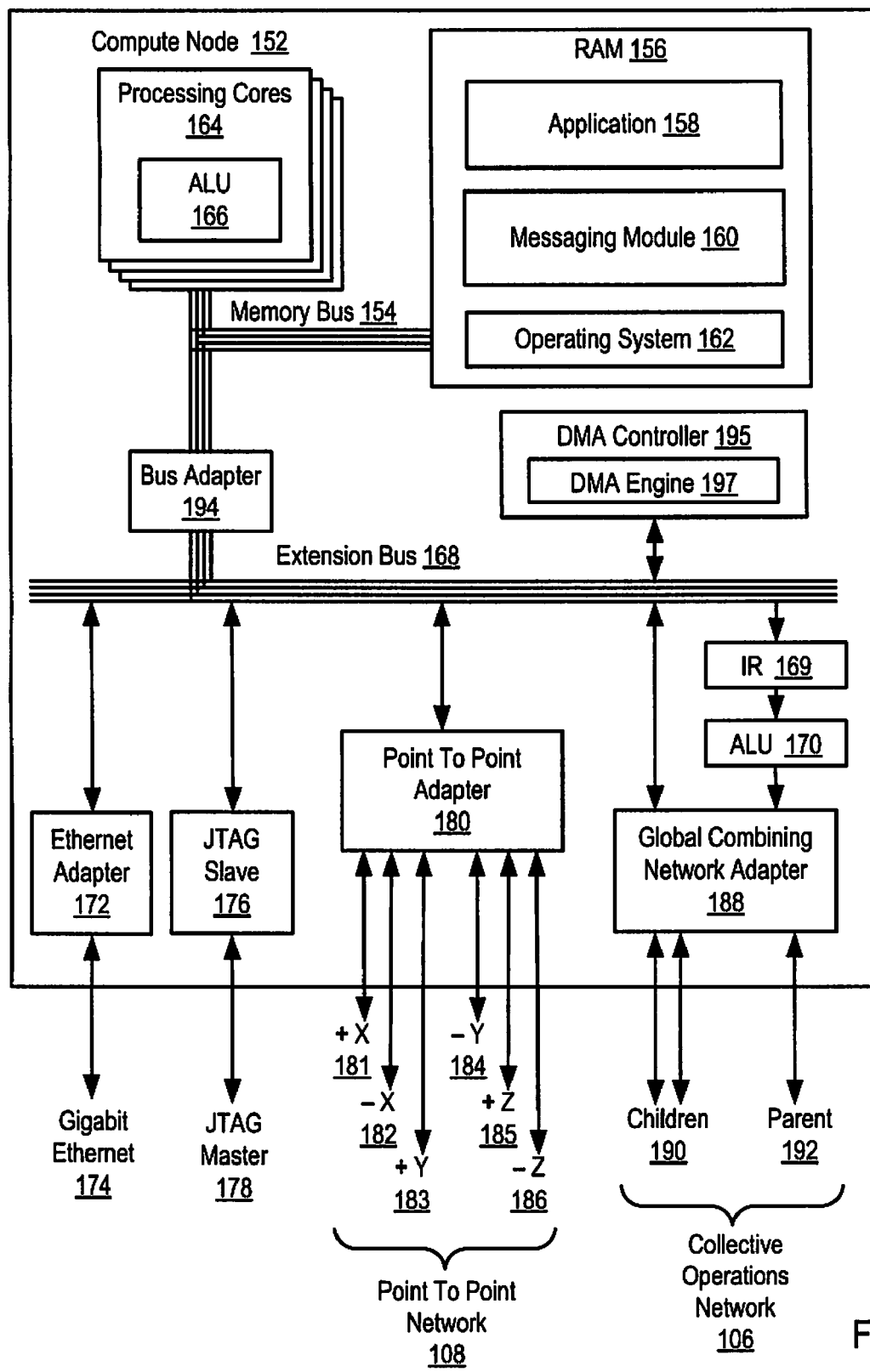
FIG. 2 sets forth a block diagram of an exemplary compute node useful in a parallel computer capable of pacing a data transfer between compute nodes on a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for pacing a data transfer between compute nodes on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in pacing a data transfer between compute nodes on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is configured for pacing a data transfer between compute nodes on a parallel computer according to embodiments of the present invention. The compute node (152) of FIG. 2 operates generally for pacing a data transfer between compute nodes on a parallel computer according to embodiments of the present invention as follows: transferring a chunk of an application message to a target compute node; sending a pacing request to a target DMA engine on the target compute node using a remote get DMA operation; determining whether a pacing response to the pacing request has been received from the target DMA engine; and transferring a next chunk of the application message if the pacing response to the pacing request has been received from the target DMA engine. In addition, the compute node (152) of FIG. 2 operates generally for pacing a data transfer between compute nodes on a parallel computer according to embodiments of the present invention by waiting to transfer the next chunk of the application message if the pacing response to the pacing request has not been received from the target DMA engine.

Figure 3A:
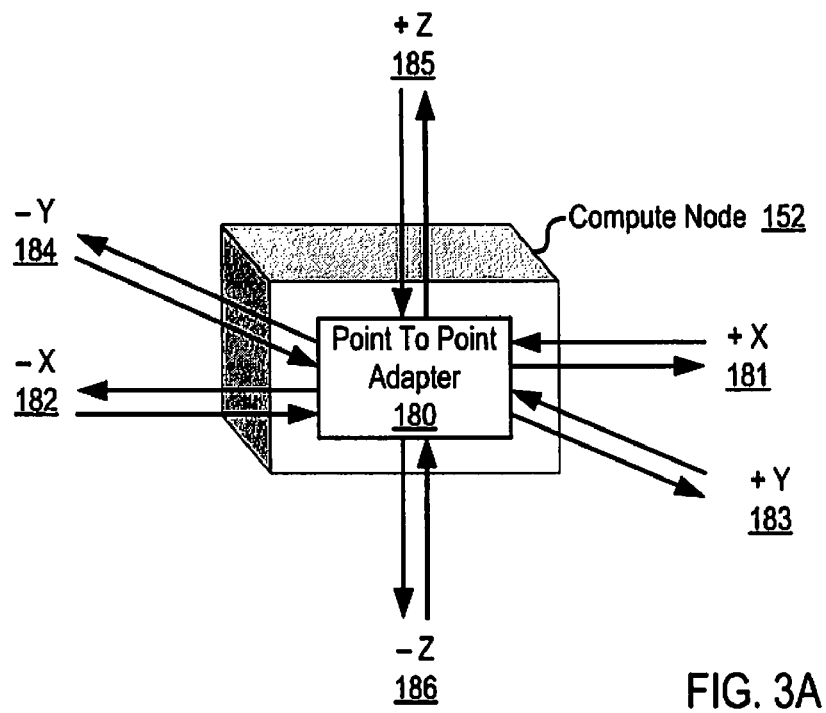
FIG. 3A illustrates an exemplary Point To Point Adapter useful in systems capable of pacing a data transfer between compute nodes on a parallel computer according to embodiments of the present invention.

For further explanation, FIG. 3A illustrates an exemplary Point To Point Adapter (180) useful in systems capable of pacing a data transfer between compute nodes on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
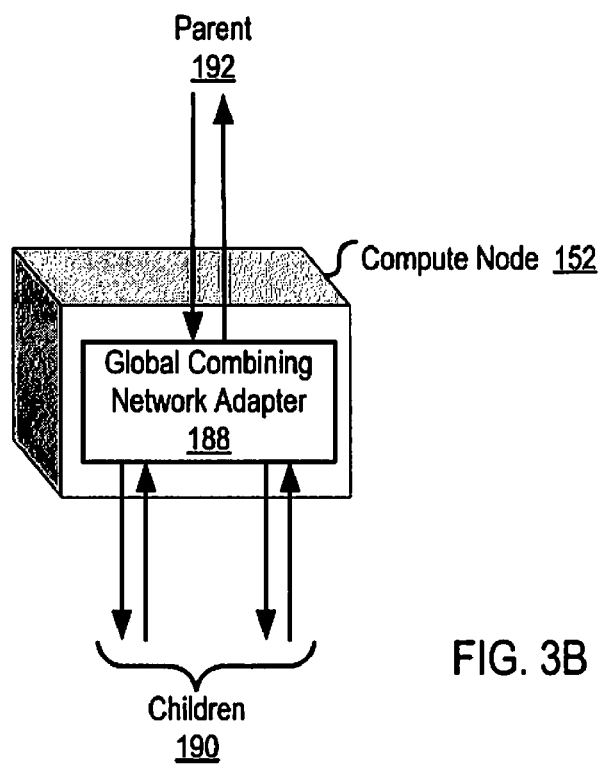
FIG. 3B illustrates an exemplary Global Combining Network Adapter useful in systems capable of pacing a data transfer between compute nodes on a parallel computer according to embodiments of the present invention.

For further explanation, FIG. 3B illustrates an exemplary Global Combining Network Adapter (188) useful in systems capable of pacing a data transfer between compute nodes on a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
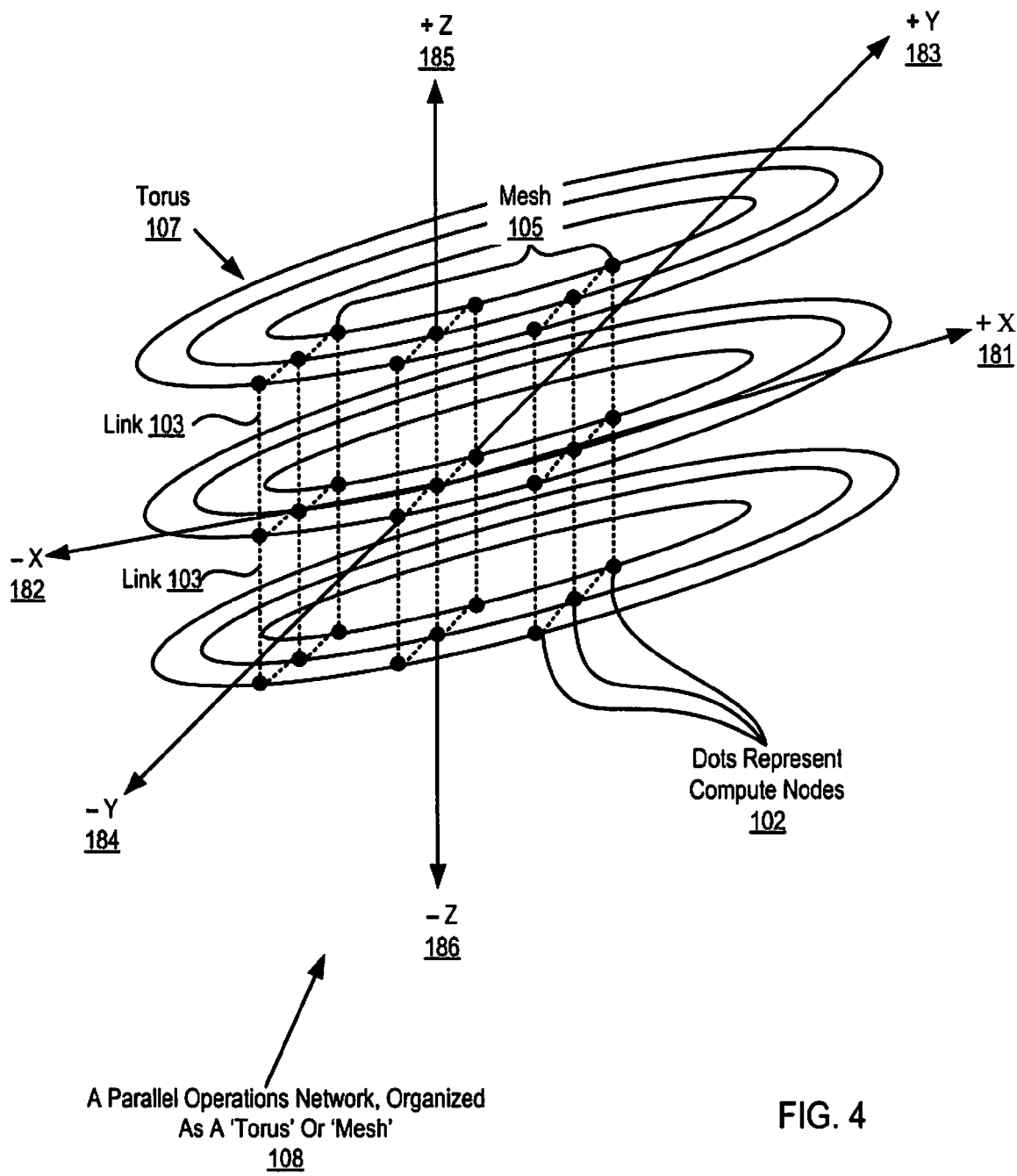
FIG. 4 sets forth a line drawing illustrating an exemplary data communications network optimized for point to point operations useful in systems capable of pacing a data transfer between compute nodes on a parallel computer in accordance with embodiments of the present invention.

For further explanation, FIG. 4 sets forth a line drawing illustrating an exemplary data communications network (108) optimized for point to point operations useful in systems capable of pacing a data transfer between compute nodes on a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in pacing a data transfer between compute nodes on a parallel computer in accordance with embodiments of the present invention may contain only a few compute nodes or may contain thousands of compute nodes.

Figure 5:
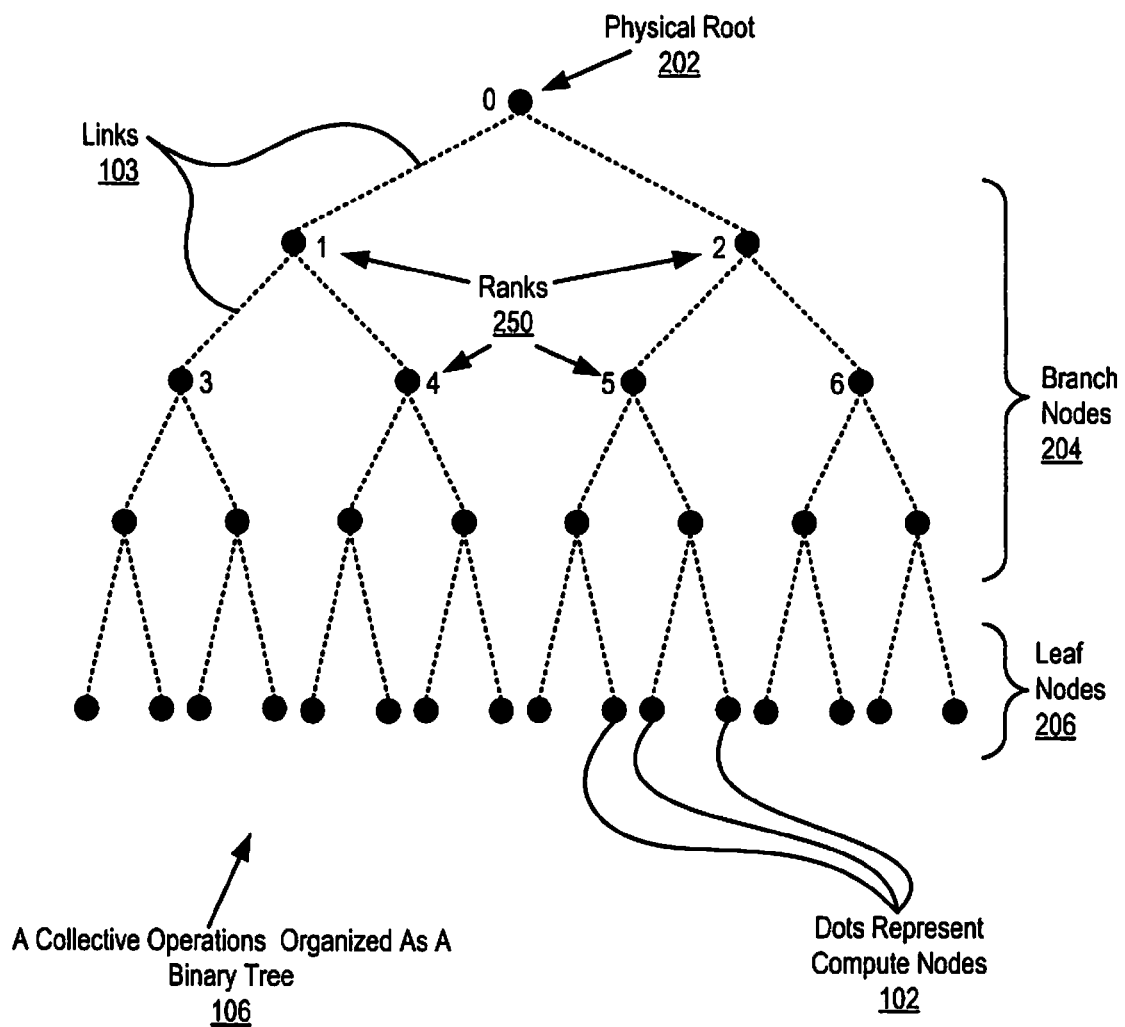
FIG. 5 sets forth a line drawing illustrating an exemplary data communications network optimized for collective operations useful in systems capable of pacing a data transfer between compute nodes on a parallel computer in accordance with embodiments of the present invention.

For further explanation, FIG. 5 sets forth a line drawing illustrating an exemplary data communications network (106) optimized for collective operations useful in systems capable of pacing a data transfer between compute nodes on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for pacing a data transfer between compute nodes on a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
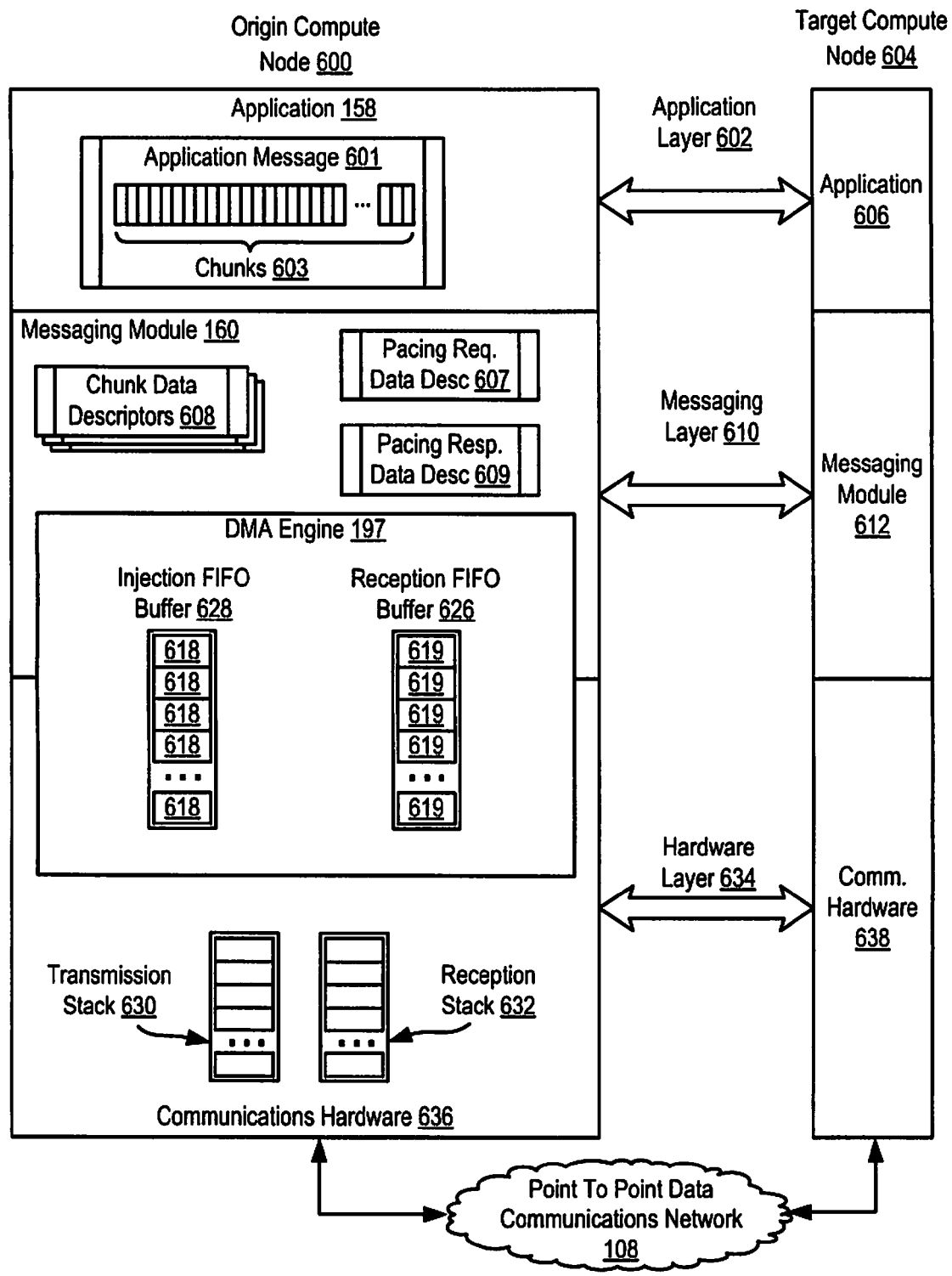
FIG. 6 sets forth a block diagram illustrating an exemplary communications architecture illustrated as a protocol stack useful in pacing a data transfer between compute nodes on a parallel computer according to embodiments of the present invention.

For further explanation, FIG. 6 sets forth a block diagram illustrating an exemplary communications architecture illustrated as a protocol stack useful in pacing a data transfer between compute nodes on a parallel computer according to embodiments of the present invention. The exemplary communications architecture of FIG. 6 sets forth two compute nodes, an origin compute node (600) and a target compute node (604). Only two compute nodes are illustrated in the example of FIG. 6 for ease of explanation and not for limitation. In fact, pacing a data transfer between compute nodes on a parallel computer according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604). In the example of FIG. 6, the application (158) on the origin compute node (600) has an application message (601) for transmission to the application (606) on the target compute node (604). Data communications between applications (158, 606) are effected using messaging modules (160, 612) installed on each of the compute nodes (600, 604). Applications (158, 606) may communicate by invoking function of an application programming interfaces ('API') exposed by the application messaging modules (606, 612). To transmit the message (601) to the application (606), the application (158) of FIG. 6 may invoke a function of an API for messaging module (160) that passes a buffer identifier of an application buffer containing the application message (601) to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the origin compute node (600) and messaging module (612) installed on the target compute node (604).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the origin compute node (600), communications hardware (638) of the target compute node (636), and the data communications network (108) connecting the origin compute node (600) to the target compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in pacing a data transfer between compute nodes on a parallel computer according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive message packets (619) from other DMA engines on other compute nodes. Although FIG. 6 only illustrates a single injection FIFO buffer (628) and a single reception FIFO buffer (626), readers will note that a DMA engine may have access to any number of injection FIFO buffers and reception FIFO buffers.

In the example of FIG. 6, the application (158), the messaging module (160), the DMA engine (197), and the communications hardware (636) all operate to support pacing a data transfer between compute nodes (600, 604) on a parallel computer according to embodiments of the present invention. As mentioned above, the application (158) of FIG. 6 may pass a buffer identifier of an application buffer containing the application message (601) to the messaging module (160). Upon receiving the buffer identifier, the messaging module (160) may then partition the application message (601) into chunks (603). For each chunk (603) of the application message (601), the messaging module (160) creates a data descriptor (608). The messaging module (160) then transfers one of the chunks (603) of the application message (601) to the target compute node (604) by placing the corresponding chunk data descriptor (608) into the injection FIFO buffer (628) of the origin DMA engine (197).

In addition to creating chunk data descriptors (608), the messaging module (160) also creates a pacing request data descriptor (607) and a pacing response data descriptor (609). The pacing request data descriptor (607) of FIG. 6 specifies a pacing request for transmission to the target compute node (604), while the pacing response data descriptor (609) of FIG. 6 specifies a pacing response for transmission from the target compute node (604) to the origin compute node (600). In the example of FIG. 6, the pacing request data descriptor (607) of FIG. 6 specifies a remote get DMA operation and specifies the pacing response data descriptor (609) as the payload for the pacing request. After transferring a chunk (603) of the message (601), the messaging module (160) sends a pacing request to a target DMA engine on the target compute node using a remote get DMA operation by injecting the pacing request data descriptor (607) in the injection FIFO buffer (628) for transmission to the target compute node (604). Using a remote get DMA operation to send the pacing request to the target DMA engine allows the origin compute node (600) to ping the target compute node (604) without invoking a processor core of the target compute node (604).

Upon receiving the pacing response data descriptor (609) as the payload of the pacing request, the target DMA engine on the target compute node (604) injects the pacing response data descriptor (609) into its own remote get injection FIFO buffer. Upon processing the pacing response data descriptor (609), the target DMA engine sends a pacing packet back to the origin DMA engine (197) on the origin compute node (600) as specified by the pacing response data descriptor (609). The pacing packet received by the origin compute node (600) provides a pacing response to the pacing request sent by the origin compute node (600).

Because the pacing response data descriptor (609) specifies a memory FIFO DMA operation, the origin DMA engine (197) places the pacing packet in the reception FIFO buffer (626) for processing by a processing core on the origin compute node. Placing the pacing packet in the reception FIFO buffer (626) provides a mechanism for the messaging module (160) to determine whether a pacing response to the pacing request has been received from the target DMA engine because the processing core of the origin compute node can notify the messaging module (160) that the pacing response has been received when the processing core processes the pacing packet in the reception FIFO buffer (626). The messaging module (160) of FIG. 6 may then transfer the next chunk (603) of the application message (601) if the pacing response to the pacing request has been received from the target DMA engine or wait to transfer the next chunk (603) of the application message (601) if the pacing response to the pacing request has not been received from the target DMA engine.

A memory FIFO data transfer operation is a mode of transferring data using DMA engines, typically a DMA engine on an origin node and a DMA engine on a target node. In a memory FIFO data transfer operation, data is transferred along with a data descriptor describing the data from one DMA engine to another DMA engine. The DMA engine receiving the data and its descriptor in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

Figure 7:
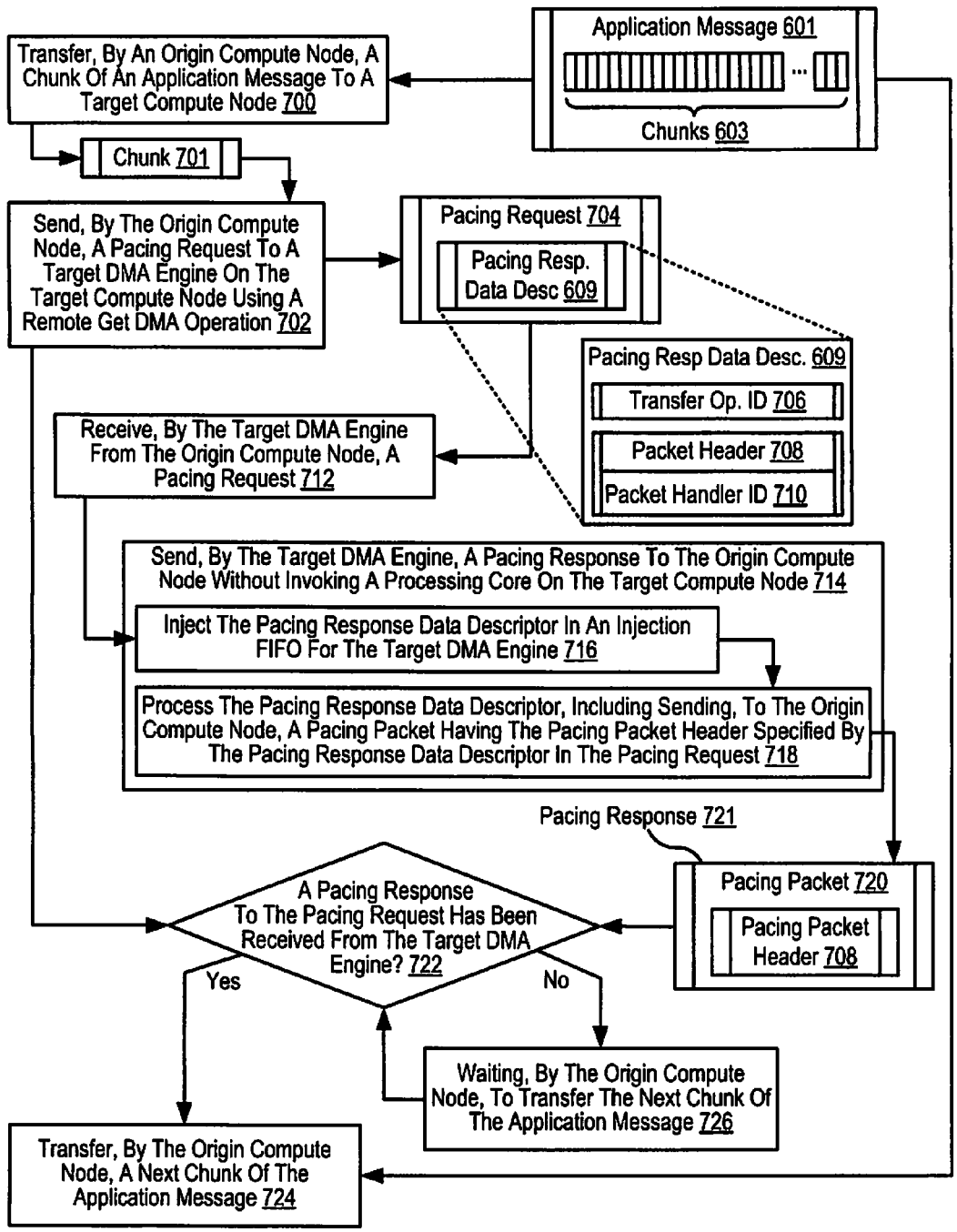
FIG. 7 sets forth a flow chart illustrating an exemplary method for pacing a data transfer between compute nodes on a parallel computer according to the present invention.

For further explanation, FIG. 7 sets forth a flow chart illustrating an exemplary method for pacing a data transfer between compute nodes on a parallel computer according to the present invention. The method of FIG. 7 includes transferring (700), by an origin compute node, a chunk (701) of an application message (601) to a target compute node. The origin compute node may transfer (700) a chunk (701) of an application message (601) to a target compute node according to the method of FIG. 7 by creating a data descriptor for the chunk (701) and injecting the data descriptor for the chunk (701) in an injection FIFO buffer of an origin DMA engine on the origin compute node. The origin DMA engine on the origin compute node may then encapsulate the chunk (701) into packets and inject the packets onto a data communications network that connects the origin compute node to the target compute node.

The method of FIG. 7 also includes sending (702), by the origin compute node, a pacing request (704) to a target direct memory access ('DMA') engine on the target compute node using a remote get DMA operation. The pacing request (704) of FIG. 7 represents a request message sent to a target compute node for eliciting a response message back to the origin compute node that may be used to identify a time period that begins when the request message is sent and ends when the response message is received. The time period identified by the request/response message pair typically forms the basis of some action on the origin compute node. In the exemplary method of FIG. 7, the identified time period is used to pace the data transfer of the application message (601) from the origin compute node to the target compute node.

The pacing request (704) of FIG. 7 elicits a response message from the target DMA engine because the pacing request (704) is implemented as a remote get message that includes a pacing response data descriptor (609). The pacing response data descriptor (609) of FIG. 7 includes all the information needed by the target DMA engine to generate a pacing response (721) without invoking a target processing core on the target compute node. Because the pacing request (704) is a remote get message, the target DMA engine processes the pacing response data descriptor (609) to generate a pacing response (721) upon receiving the pacing request (704).

In the method of FIG. 7, the origin compute node may send (702) a pacing request (704) to a target DMA engine on the target compute node using a remote get DMA operation according to the method of FIG. 7 by creating a pacing request data descriptor that represents the pacing request (704), creating a pacing response data descriptor (609), and configuring the pacing request data descriptor to specify the pacing response data descriptor (609) as the payload for the pacing request (704). The origin compute node may then send (702) a pacing request (704) to a target DMA engine on the target compute node using a remote get DMA operation according to the method of FIG. 7 by injecting the pacing request data descriptor into an injection FIFO buffer for the origin DMA engine. Upon processing the pacing request data descriptor, the origin DMA engine encapsulates the pacing response data descriptor (609) into packets and transmits the packets through a data communications network to the target DMA engine.

The method of FIG. 7 includes receiving (712), by the target DMA engine from the origin compute node, the pacing request (704). The target DMA engine may receive (712) the pacing request (704) from the origin compute node according to the method of FIG. 7 by receiving packets that encapsulate the pacing request (704) from a data communications network connecting the origin compute node and the target compute node.

The method of FIG. 7 also includes sending (714), by the target DMA engine in response to receiving the pacing request (704), a pacing response (721) to the origin compute node without invoking a processing core on the target compute node. The target DMA engine may send (714) a pacing response (721) to the origin compute node in response to receiving the pacing request (704) according to the method of FIG. 7 by injecting (716) the pacing response data descriptor (609) in an injection FIFO for the target DMA engine. The target DMA engine may inject (716) the pacing response data descriptor (609) in an injection FIFO buffer for the target DMA engine according to the method of FIG. 7 by unencapsulating the packet response data descriptor (609) from the packets received by the target DMA engine from the origin compute node and storing the packet response data descriptor (609) in the injection FIFO buffer for the target DMA engine.

In the example of FIG. 7, the pacing response data descriptor (609) in the pacing request (704) specifies a pacing packet header (708) for a memory FIFO data transfer from the target compute node to the origin compute node. The pacing response data descriptor (609) of FIG. 7 designates that the pacing response (721) is to be sent using a memory FIFO data transfer operation using a transfer operation identifier field (706). Implementing a pacing response (721) with a memory FIFO transfer ensures that the origin processing core on the origin compute node will be notified when the origin compute node receives the pacing response (721). The target DMA engine may send (714) a pacing response (721) to the origin compute node in response to receiving the pacing request (704) according to the method of FIG. 7 by processing (718) the pacing response data descriptor (609), including sending, to the origin compute node, a pacing packet (720) having the pacing packet header (708) specified by the pacing response data descriptor (609) in the pacing request (704).

The method of FIG. 7 includes determining (722), by the origin compute node, whether a pacing response (721) to the pacing request (704) has been received from the target DMA engine. The origin compute node may determine (722) whether a pacing response (721) to the pacing request (704) has been received from the target DMA engine according to the method of FIG. 7 by receiving, by the origin DMA engine on the origin compute node from the target DMA engine in a reception FIFO for the origin DMA engine, a pacing packet having the pacing packet header specified by the pacing response data descriptor in the pacing request and executing, by an origin processing core on the origin compute node, a pacing packet handler specified in the pacing packet header. An interrupt that is triggered when the pacing packet (720) is stored in the injection FIFO buffer may be used to notify the processing core on the origin compute node that a pacing packet is available for packet handling. The pacing packet header (708) may specify a packing packet handler using a pacing packet handler identifier field (710). The value of the pacing packet handler identifier field (710) designates a particular packet handler on the origin compute node capable of notifying messaging software that the pacing response (721) to the pacing request (704) has been received from the target DMA engine. In the method of FIG. 7, if the origin DMA engine receives a pacing packet (720) from the target DMA engine and the processing core on the origin compute node executes the packet handler specified in the pacing packet (720), then the pacing response (721) to the pacing request (704) has been received from the target DMA engine. The pacing response (721) to the pacing request (704) has not been received from the target DMA engine, however, if the origin DMA engine has not received a pacing packet (720) from the target DMA engine.

The method of FIG. 7 includes transferring (724), by the origin compute node, a next chunk of the application message (601) if the pacing response (721) to the pacing request (704) has been received from the target DMA engine. The origin compute node may transfer (724) the next chunk of the application message (601) according to the method of FIG. 7 by creating a data descriptor for the next chunk and injecting the data descriptor for the next chunk in the injection FIFO buffer of an origin DMA engine on the origin compute node. The origin DMA engine on the origin compute node may then encapsulate the next chunk into packets and inject the packets onto a data communications network that connects the origin compute node to the target compute node.

The method of FIG. 7 also includes waiting (726), by the origin compute node, to transfer the next chunk of the application message (601) if the pacing response (721) to the pacing request (704) has not been received from the target DMA engine. The origin compute node may wait (726) to transfer the next chunk of the application message (601) according to the method of FIG. 7 by waiting to receive the pacing packet (720) from the target DMA engine having the pacing packet header (708) specified in the pacing response data descriptor (609) that was included in the pacing request (704).

Figure 8:
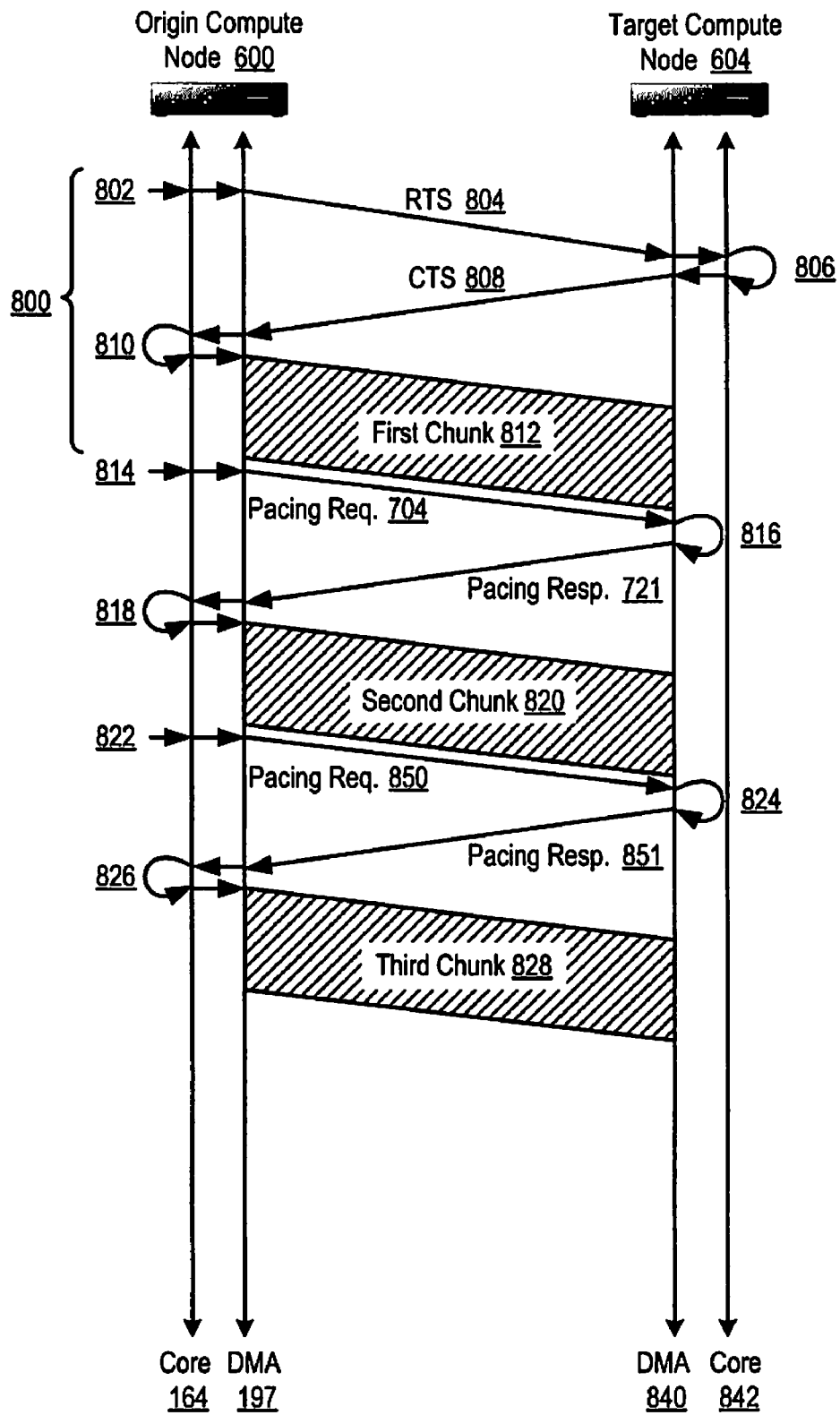
FIG. 8 sets forth a call sequence diagram illustrating an exemplary call sequence for pacing a data transfer between compute nodes on a parallel computer according to the present invention.

For further explanation, FIG. 8 sets forth a call sequence diagram illustrating an exemplary call sequence for pacing a data transfer between compute nodes on a parallel computer according to the present invention. In the exemplary call sequence diagram of FIG. 8, the origin compute node (600) transfers (800) a first chunk (812) of an application message to a target compute node (604). A processing core (164) on the origin compute node (600) initiates the transfer by sending (802) a Request to Send ('RTS') message (804) to the target compute node (604). The RTS message (804) is a control message indicating that the origin compute node (600) has an application message to transfer to the target compute node (604). In addition, the RTS message (804) describes the application message to the target compute node (604) such as, for example, by providing the total size of the message.

In the exemplary call sequence diagram of FIG. 8, the target DMA engine (840) of the target compute node (604) receives the RTS message (804). The processing core (842) of the target compute node (604) processes (806) the RTS message (804) by allocating storage on the target compute node (604) to store the application message and setting up a DMA counter for tracking when the message transfer is complete. The target compute node (604) then sends (806) a Clear to Send ('CTS') message (808) back to the origin compute node (600) to indicate that the target compute node (604) is ready to receive the application message. The CTS message (808) provides the origin compute node (600) with storage information that specifies where to store the application message on the target compute node (604).

In the exemplary call sequence diagram of FIG. 8, the origin DMA engine (197) receives the CTS message (808) from the target compute node (604). The origin processing core (197) processes (810) the CTS message (808) and partitions (810) the application message into three chunks for transfer to the target compute node (604). Readers will note that partitioning the application message into three chunks (812, 820, 828) is for explanation and not for limitation. The origin compute may partition an application message into any number of chunks as will occur to those of skill in the art. The processing core (164) then injects (810) a direct put data descriptor for the first chunk (812) into an injection FIFO buffer for the origin DMA engine (197). The origin DMA engine (197) packetizes the first chunk (812) and transmits the packets to the target DMA engine (840). As the target DMA engine (840) receives the first chunk (812), the target DMA engine (840) decrements the DMA counter used to track when the data transfer is complete.

After transferring the first chunk (812) of the message, the processing core (164) on the origin compute node (600) sends (814) a pacing request (704) to a target DMA engine (840) on the target compute node using a remote get DMA operation. The processing core (164) sends a pacing request (704) to the target DMA engine (840) by creating a pacing request data descriptor and a pacing response data descriptor. The processing core (164) then injects the pacing request data descriptor into the injection FIFO buffer for the origin DMA engine (197). The origin DMA engine (197), then in turn, creates the remote get pacing request (704) and transmits the pacing request (704) to the target DMA engine (840) with the pacing response data descriptor as the payload to the pacing request (704).

In the exemplary call sequence diagram of FIG. 8, the target DMA engine (840) receives (816) the pacing request (704) from the origin compute node (600). In response to receiving the pacing request (704), the target DMA engine (840) sends (816) a pacing response (721) to the origin compute node (600) without invoking a processing core (842) on the target compute node (604). The target DMA engine (840) sends (816) the pacing response (721) to the origin compute node (600) by injecting the pacing response data descriptor specified by the pacing request (704) in the injection FIFO buffer for the target DMA engine (840) and processing the pacing response data descriptor. Upon processing the pacing response data descriptor, the target DMA engine (840) may generate a pacing packet for transmission to the origin compute node (600). The pacing packet serves as the pacing response (721) in the exemplary call sequence diagram of FIG. 8.

In the exemplary call sequence diagram of FIG. 8, the origin compute node (600) determines (818) whether a pacing response (721) to the pacing request (704) has been received from the target DMA engine (840). The origin compute node (600) may determine (818) whether a pacing response (721) to the pacing request (704) has been received from the target DMA engine (840) by receiving a pacing packet from the target DMA engine (840) and executing a pacing packet handler specified in the pacing packet header of the pacing packet received from the target DMA engine (840). If the origin DMA engine (197) receives a pacing packet from the target DMA engine (840) and the processing core (164) executes a pacing packet handler specified in the pacing packet header of the pacing packet, then the pacing response (721) to the pacing request (704) has been received from the target DMA engine (840). The pacing response (721) to the pacing request (704) has not been received from the target DMA engine (840), however, if the origin DMA engine (197) does not receive a pacing packet from the target DMA engine (840).

In the exemplary call sequence diagram of FIG. 8, the origin compute node (600) transfers (818) the second chunk (820) of the application message to the target DMA engine (840) if the pacing response (721) to the pacing request (704) has been received from the target DMA engine (840). The origin compute node (600) may transfer (818) the next chunk (820) of the application message to the target DMA engine (840) by injecting a data descriptor for the second chunk (820) into the injection FIFO buffer for the origin DMA engine (197). As the target DMA engine (840) receives the second chunk (820), the target DMA engine (840) decrements the DMA counter used to track when the message transfer is complete.

After transferring the second chunk (820) of the message, the processing core (164) on the origin compute node (600) sends (822) a pacing request (850) to a target DMA engine (840) on the target compute node using a remote get DMA operation. The processing core (164) sends a pacing request (850) to the target DMA engine (840) by creating a pacing request data descriptor and a pacing response data descriptor. The processing core (164) then injects the pacing request data descriptor into the injection FIFO buffer for the origin DMA engine (197). The origin DMA engine (197), then in turn, creates the remote get pacing request (850) and transmits the pacing request (850) to the target DMA engine (840) with the pacing response data descriptor as the payload to the pacing request (850).

In the exemplary call sequence diagram of FIG. 8, the target DMA engine (840) receives (824) the pacing request (850) from the origin compute node (600). In response to receiving the pacing request (850), the target DMA engine (840) sends (824) a pacing response (851) to the origin compute node (600) without invoking a processing core (842) on the target compute node (604). The target DMA engine (840) sends (824) the pacing response (850) to the origin compute node (600) by injecting the pacing response data descriptor specified by the pacing request (850) in the injection FIFO buffer for the target DMA engine (840) and processing the pacing response data descriptor. Upon processing the pacing response data descriptor, the target DMA engine (840) may generate a pacing packet for transmission to the origin compute node (600). The pacing packet serves as the pacing response (851) in the exemplary call sequence diagram of FIG. 8.

After sending the pacing request (850), the origin compute node (600) determines (818) whether a pacing response (851) to the pacing request (850) has been received from the target DMA engine (840). The origin compute node (600) may determine (818) whether a pacing response (851) to the pacing request (850) has been received from the target DMA engine (840) by receiving a pacing packet from the target DMA engine (840) and executing a pacing packet handler specified in the pacing packet header of the pacing packet received from the target DMA engine (840). If the origin DMA engine (197) receives a pacing packet from the target DMA engine (840) and the processing core (164) executes a pacing packet handler specified in the pacing packet header of the pacing packet, then the pacing response (851) to the pacing request (850) has been received from the target DMA engine (840). The pacing response (851) to the pacing request (850) has not been received from the target DMA engine (840), however, if the origin DMA engine (197) does not receive a pacing packet from the target DMA engine (840).

In the exemplary call sequence diagram of FIG. 8, the origin compute node (600) transfers (818) the third chunk (828) of the application message to the target DMA engine (840) if the pacing response (851) to the pacing request (850) has been received from the target DMA engine (840). The origin compute node (600) may transfer (818) the third chunk (828) of the application message to the target DMA engine (840) by injecting a data descriptor for the third chunk (828) into the injection FIFO buffer for the origin DMA engine (197). As the target DMA engine (840) receives the third chunk (828), the target DMA engine (840) decrements the DMA counter used to track when the message transfer is complete. Upon decrementing the counter to zero, the target DMA engine (840) notifies the processing core (842) on the target compute node (604) that the data transfer is complete using a callback function. Similarly, the origin DMA engine (197) decrements a DMA counter used to track when the message transfer is complete as each message chunk is transferred to the target DMA engine (840). Upon decrementing the counter to zero, the origin DMA engine (197) notifies the processing core (164) on the origin compute node (600) that the data transfer is complete using a callback function.

Readers will note from the exemplary call sequence diagram of FIG. 8 that the time period between sending a pacing request and receiving a pacing response depends on network traffic congestion. Increased network congestion results in longer periods of time between sending a pacing request and receiving a pacing response, thereby decreasing the rate at which the origin compute node transfers chunks of an application message to a target compute node. Decreased network congestion results in shorter periods of time between sending a pacing request and receiving a pacing response, thereby increasing the rate at which the origin compute node transfers chunks of an application message to a target compute node.

Exemplary embodiments of the present invention are described largely in the context of a fully functional computer system for pacing a data transfer between compute nodes on a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for pacing a data transfer between compute nodes on a parallel computer, the method further comprising:
transferring, by an origin compute node, a chunk of an application message to a target compute node;
sending, by the origin compute node, a pacing request to a target direct memory access ('DMA') engine on the target compute node using a remote get DMA operation, wherein the pacing request further comprises a pacing response data descriptor that specifies a pacing packet header for a memory first-in-first-out ('FIFO') data transfer from the target compute node to the origin compute node;
determining, by the origin compute node, whether a pacing response to the pacing request has been received from the target DMA engine, wherein determining whether a pacing response to the pacing request has been received from the target DMA engine further comprises:
receiving, by an origin DMA engine on the origin compute node from the target DMA engine in a reception FIFO for the origin DMA engine, a pacing packet having the pacing packet header specified by the pacing response data descriptor in the pacing request, and
executing, by an origin processing core on the origin compute node, a pacing packet handler specified in the pacing packet header; and
transferring, by the origin compute node, a next chunk of the application message if the pacing response to the pacing request has been received from the target DMA engine.

2. The method for claim 1 further comprising waiting, by the origin compute node, to transfer the next chunk of the application message if the pacing response to the pacing request has not been received from the target DMA engine.

3. The method of claim 1 further comprising:
receiving, by the target DMA engine from the origin compute node, the pacing request; and
sending, by the target DMA engine in response to receiving the pacing request, a pacing response to the origin compute node without invoking a processing core on the target compute node.

4. The method of claim 3 wherein:
sending, by the target DMA engine, a pacing response to the origin compute node without invoking a processing core on the target compute node further comprises:
injecting the pacing response data descriptor in an injection FIFO buffer for the target DMA engine, and
processing the pacing response data descriptor, including sending, to the origin compute node, a pacing packet having the pacing packet header specified by the pacing response data descriptor in the pacing request.

5. The method of claim 1 wherein the origin compute node and the target compute node are comprised in the parallel computer, the parallel computer comprising a plurality of compute nodes connected for data communications through a data communications network, the data communications network optimized for point to point data communications.

6. A parallel computer for pacing a data transfer between compute nodes, the parallel computer comprising one or more computer processors, computer memory operatively coupled to the computer processors, the computer memory having disposed within it computer program instructions capable of:
transferring, by an origin compute node, a chunk of an application message to a target compute node;
sending, by the origin compute node, a pacing request to a target direct memory access ('DMA') engine on the target compute node using a remote get DMA operation, wherein the pacing request further comprises a pacing response data descriptor that specifies a pacing packet header for a memory first-in-first-out ('FIFO') data transfer from the target compute node to the origin compute node;
determining, by the origin compute node, whether a pacing response to the pacing request has been received from the target DMA engine, wherein determining whether a pacing response to the pacing request has been received from the target DMA engine further comprises:
receiving, by an origin DMA engine on the origin compute node from the target DMA engine in a reception FIFO for the origin DMA engine, a pacing packet having the pacing packet header specified by the pacing response data descriptor in the pacing request, and
executing, by an origin processing core on the origin compute node, a pacing packet handler specified in the pacing packet header; and
transferring, by the origin compute node, a next chunk of the application message if the pacing response to the pacing request has been received from the target DMA engine.

7. The parallel computer for claim 6 wherein the computer memory also has disposed within it computer program instructions capable of waiting, by the origin compute node, to transfer the next chunk of the application message if the pacing response to the pacing request has not been received from the target DMA engine.

8. The parallel computer for claim 6 wherein the computer memory also has disposed within it computer program instructions capable of:
receiving, by the target DMA engine from the origin compute node, the pacing request; and
sending, by the target DMA engine in response to receiving the pacing request, a pacing response to the origin compute node without invoking a processing core on the target compute node.

9. The parallel computer for claim 8 wherein:
sending, by the target DMA engine, a pacing response to the origin compute node without invoking a processing core on the target compute node further comprises:
injecting the pacing response data descriptor in an injection FIFO buffer for the target DMA engine, and
processing the pacing response data descriptor, including sending, to the origin compute node, a pacing packet having the pacing packet header specified by the pacing response data descriptor in the pacing request.

10. The parallel computer for claim 6 wherein the origin compute node and the target compute node are comprised in the parallel computer, the parallel computer comprising a plurality of compute nodes connected for data communications through a data communications network, the data communications network optimized for point to point data communications.

11. A computer program product for pacing a data transfer between compute nodes on a parallel computer, the computer program product comprising:
one or more computer-readable memory devices;
program instructions, stored on at least one of the one or more memory device to transfer, by an origin compute node, a chunk of an application message to a target compute node;
program instructions, stored on at least one of the one or more memory device to send, by the origin compute node, a pacing request to a target direct memory access ('DMA') engine on the target compute node using a remote get DMA operation, wherein the pacing request further comprises a pacing response data descriptor that specifies a pacing packet header for a memory first-in-first-out ('FIFO') data transfer from the target compute node to the origin compute node;
program instructions, stored on at least one of the one or more memory device to determine, by the origin compute node, whether a pacing response to the pacing request has been received from the target DMA engine, wherein determining whether a pacing response to the pacing request has been received from the target DMA engine further comprises:
receiving, by an origin DMA engine on the origin compute node from the target DMA engine in a reception FIFO for the origin DMA engine, a pacing packet having the pacing packet header specified by the pacing response data descriptor in the pacing request, and
executing, by an origin processing core on the origin compute node, a pacing packet handler specified in the pacing packet header; and
program instructions, stored on at least one of the one or more memory device to transfer, by the origin compute node, a next chunk of the application message if the pacing response to the pacing request has been received from the target DMA engine.

12. The computer program product for claim 11 further comprising computer program instructions capable of waiting, by the origin compute node, to transfer the next chunk of the application message if the pacing response to the pacing request has not been received from the target DMA engine.

13. The computer program product for claim 11 further comprising computer program instructions capable of:
receiving, by the target DMA engine from the origin compute node, the pacing request; and
sending, by the target DMA engine in response to receiving the pacing request, a pacing response to the origin compute node without invoking a processing core on the target compute node.

14. The computer program product for claim 13 wherein:
sending, by the target DMA engine, a pacing response to the origin compute node without invoking a processing core on the target compute node further comprises:
injecting the pacing response data descriptor in an injection FIFO buffer for the target DMA engine, and
processing the pacing response data descriptor, including sending, to the origin compute node, a pacing packet having the pacing packet header specified by the pacing response data descriptor in the pacing request.

15. The computer program product for claim 11 wherein the origin compute node and the target compute node are comprised in the parallel computer, the parallel computer comprising a plurality of compute nodes connected for data communications through a data communications network, the data communications network optimized for point to point data communications.

* * * * *